(12) United States Patent
Omori

(10) Patent No.: US 8,391,137 B2
(45) Date of Patent: Mar. 5, 2013

(54) MANAGEMENT SYSTEM AND MANAGEMENT METHOD FOR MANAGING A COMMUNICATION APPARATUS

(75) Inventor: Michiko Omori, Tokyo (JP)

(73) Assignee: NEC Infrontia Corporation, Kanagawa (JP)

( * ) Notice: Subject to any disclaimer, the term of this patent is extended or adjusted under 35 U.S.C. 154(b) by 831 days.

(21) Appl. No.: 11/657,061

(22) Filed: Jan. 24, 2007

(65) Prior Publication Data

US 2007/0171896 A1     Jul. 26, 2007

(30) Foreign Application Priority Data

Jan. 25, 2006   (JP) ................... 2006-015751

(51) Int. Cl.
*H04L 12/26*   (2006.01)
(52) U.S. Cl. ..................................... 370/229
(58) Field of Classification Search .......... 370/241, 370/242, 244
See application file for complete search history.

(56) References Cited

U.S. PATENT DOCUMENTS

| | | | | |
|---|---|---|---|---|
| 6,567,912 | B1 * | 5/2003 | Belkin et al. ............... | 713/2 |
| 7,017,085 | B2 * | 3/2006 | Braun ....................... | 714/47 |
| 7,120,122 | B1 * | 10/2006 | Starr et al. ................ | 370/250 |
| 2003/0074592 | A1 * | 4/2003 | Hasegawa ................ | 713/324 |
| 2003/0163399 | A1 * | 8/2003 | Harper et al. ............. | 705/35 |
| 2003/0204792 | A1 * | 10/2003 | Cahill et al. .............. | 714/55 |

FOREIGN PATENT DOCUMENTS

| | | |
|---|---|---|
| JP | 10-327148 | 12/1998 |
| JP | 2000174751 | 6/2000 |
| JP | 2005117371 | 4/2005 |

OTHER PUBLICATIONS

JP Office Action dated May 17, 2011.

* cited by examiner

*Primary Examiner* — Mark Rinehart
*Assistant Examiner* — Mohammad Anwar
(74) *Attorney, Agent, or Firm* — Young & Thompson

(57) ABSTRACT

A management system for managing a plurality of communication apparatuses, the management system includes the plurality of communication apparatuses, a management apparatus managing the plurality of communication apparatuses by transmitting a periodic instruction to the plurality of communication apparatuses, and a network connecting the plurality of communication apparatuses and the management apparatus. Each of the plurality of communication apparatuses includes a first timer counting a first set time that elapses before a reboot processing of the self is performed, and each of the plurality of communication apparatuses performs the reboot processing of the self after a lapse of the first set time since detection of an abnormality.

8 Claims, 6 Drawing Sheets

MANAGEMENT SYSTEM AND MANAGEMENT METHOD FOR MANAGING A COMMUNICATION APPARATUS

BACKGROUND OF THE INVENTION

1. Field of the Invention

The present invention relates to a management system and management method for managing communication apparatuses, and more particularly, to a management system and management method for managing multiple Voice over Internet Protocol (VoIP) terminals in an IP telephony system.

2. Description of the Related Art

In the IP telephony system, a Multimedia Gateway Controller (MGC) controls multiple VoIP terminals via an IP network. Examples of the IP network include the Internet, an intranet, and a local area network (LAN). Examples of the VoIP terminals include a media gateway, a media converter, and an IP telephone.

Conventionally, in the IP telephony system, a periodic health check is performed by the MGC, as a means of normality diagnosis of a VoIP terminal. The cycle of performing the health check is uniquely determined independently of the VoIP terminal in the IP telephony system. The MGC issues a diagnosis request to a VoIP terminal at regular intervals and diagnoses the status of the VoIP terminal after waiting for the response from the VoIP terminal.

When the MGC judges that the VoIP terminal is abnormal through the response from the VoIP terminal, the MGC issues a reset instruction as a remedy to the VoIP terminal. Upon reception of the reset instruction, the VoIP terminal immediately performs a reset processing. The VoIP terminal then performs registration processing with respect to the MGC to work again. With this operation, the VoIP terminal works for a recovery from the abnormal status.

However, with this method, when the MGC performs the health check with respect to multiple VoIP terminals and judges that the multiple VoIP terminals become abnormal at the same time due to en excessively high load imposed on the network, the MGC issues a reset instruction to the multiple VoIP terminals at the approximately same time. Accordingly, the multiple VoIP terminals try to perform the reset processing and the registration processing simultaneously. As a result, the following problems may occur.

First, a further increase of network traffic may be caused by transmitting and receiving registration messages between the MGC and the multiple VoIP terminals. Furthermore, an excessively high load may also be imposed on the MGC.

Second, since the function of the VoIP terminal is unable to be used until the VoIP terminal completes the reset processing and the registration processing, the multiple VoIP terminals may be unable to be used at the same time. As a result, when a redundant system or a communication hierarchy is configured by the multiple VoIP terminals, there is also possibility that the advantage cannot be used enough.

A method to prevent a network traffic increase by changing the interval of the health check include a measure disclosed in Japanese Patent Laid-Open No. 10-327148, for example. In this method, an interval at which a management apparatus performs polling with respect to a management target apparatus is dynamically changed depending on a traffic state of a network. It should be noted that the "polling" means that the management apparatus sends to a management target apparatus a diagnosis request to diagnose the status of the management target apparatus at constant intervals, and the management target apparatus returns a response to the diagnosis request.

However, even this method has the same problems as described above in the case where the management apparatus manages multiple management target apparatuses. This method needs to dynamically change the polling interval for each of the multiple management target apparatuses, in the case of performing the polling with a different timing among the multiple management target apparatuses. Thus, the management apparatus is required to perform a very complicated operation. Furthermore, this method has another problem in that the management of the multiple management target apparatuses is excessively concentrated on the management apparatus.

SUMMARY OF THE INVENTION

In view of the foregoing and other exemplary problems, drawbacks, and disadvantages of the related art methods and structures, exemplary feature of the present invention is to provide a management system and a management method for effectively managing multiple communication apparatuses by distributing traffic of a network.

A management system for managing a plurality of communication apparatuses according to the present invention, the management system includes the plurality of communication apparatuses, a management apparatus managing the plurality of communication apparatuses by transmitting a periodic instruction to the plurality of communication apparatuses, and a network-connecting the plurality of communication apparatuses and the management apparatus. Each of the plurality of communication apparatuses includes a first timer counting a first set time that elapses before a reboot processing of the self is performed, and each of the plurality of communication apparatuses performs the reboot processing of the self after a lapse of the first set time since detection of an abnormality.

A communication apparatus according to the present invention, which is managed by receiving a periodic instruction from an outside via a network, the communication apparatus includes a first timer counting a first set time that elapses before a reboot processing of the self is performed. The communication apparatus performs the reboot processing of the self after a lapse of the first set time since detection of an abnormality.

A management method of managing a plurality of communication apparatuses according to the present invention, for a management system including the plurality of communication apparatuses, a management apparatus managing the plurality of communication apparatuses by transmitting a periodic instruction to the plurality of communication apparatuses, and a network connecting the plurality of communication apparatuses and the management apparatus, the method includes counting, in each of the plurality of communication apparatuses, a first set time that elapses before a reboot processing of the self is performed, and performing, by each of the plurality of communication apparatuses, the reboot processing of the self after a lapse of the first set time since detection of an abnormality.

Therefore, the management system and the management method for managing the communication apparatuses according to the present invention have an effect in which multiple communication apparatuses can be effectively managed by distributing traffic of a network, with the structure and the method described above.

BRIEF DESCRIPTION OF THE DRAWINGS

The exemplary aspects, features and advantages of the present invention will become more apparent from the following detailed description when taken in conjunction with the accompanying drawings wherein.

DETAILED DESCRIPTION OF THE PREFERRED EMBODIMENTS

Exemplary aspects for carrying out the present invention will be described in detail below with reference to the drawings. The exemplary aspects described below show only illustrative examples in understanding the present invention, and the claims of the invention are not limited to these exemplary aspects.

Figure 1:
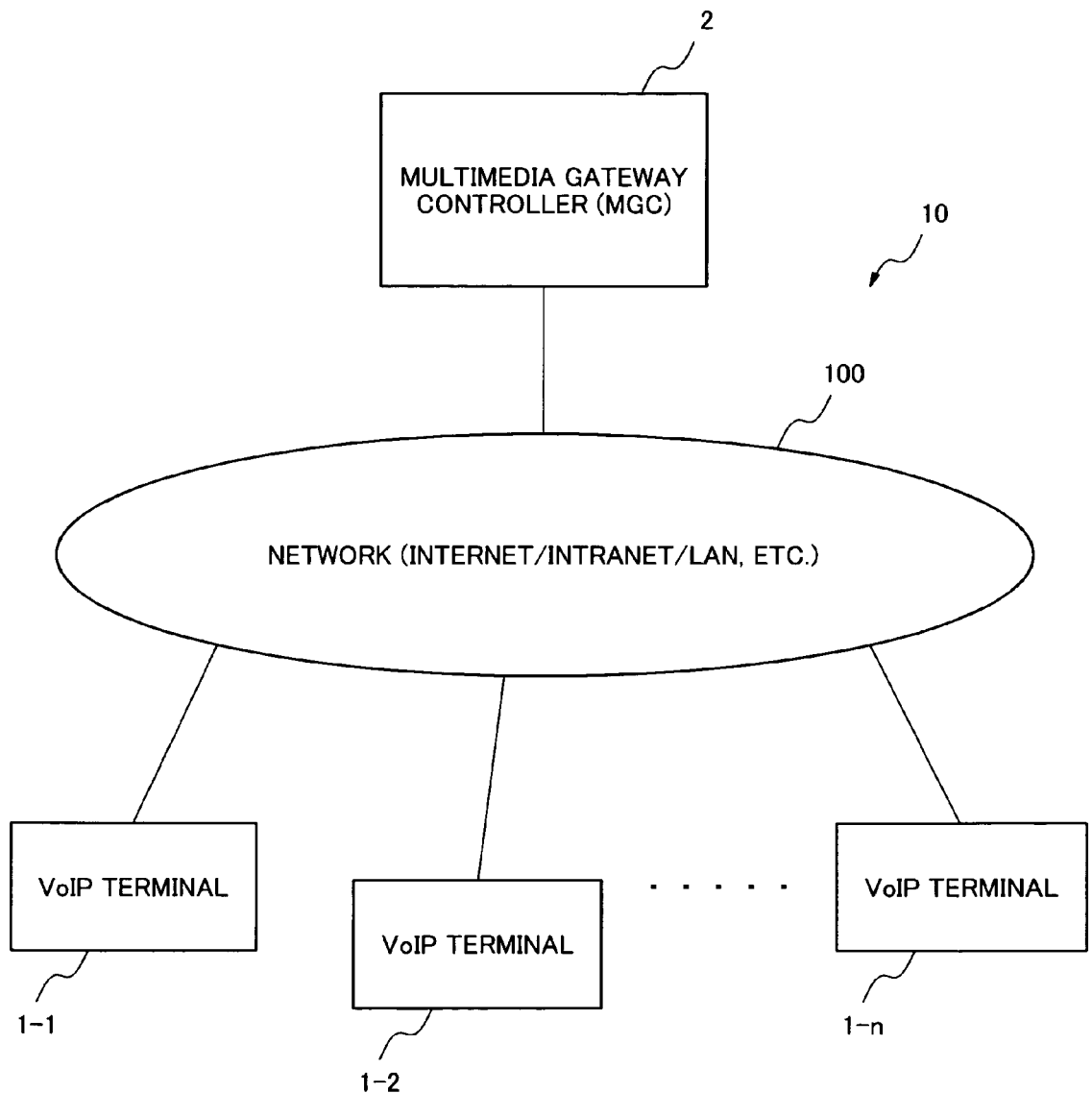
FIG. 1 is a block diagram showing a configuration of an IP telephony system according to an embodiment mode of the present invention.

Hereinafter, a management system and a management method for managing communication apparatuses, according to an embodiment mode of the present invention are described in detail. In this embodiment mode, a description is given by using an Internet Protocol (IP) telephony system as an example of a management system, a Voice over IP (VoIP) terminal as example of a communication apparatus, and a Multimedia Gateway Controller (MGC) as an example of a management apparatus. FIG. 1 is a block diagram showing a configuration of the IP telephony system according to the embodiment mode of the present invention. Hereinafter, a description is given based on FIG. 1. In FIG. 1, an IP telephony system 10 according to the embodiment mode of the present invention includes an MGC 2, a network 100, and VoIP terminals 1-1 to 1-*n* (where n is an integer of 2 or more). The MGC 2 controls call processing with respect to the VoIP terminals 1-1 to 1-*n* via the network 100. It should be noted that the network 100 includes the Internet, an intranet, and a local area network (LAN). The VoIP terminals 1-1 to 1-*n* include a media gateway, a media converter, and an IP telephone.

The VoIP terminals 1-1 to 1-*n* are connected to the same network and have functions of the same type or different types. The VoIP terminals 1-1 to 1-*n* each have a self reboot function. The self reboot function is used to perform reset processing with respect to the own terminal. Furthermore, the VoIP terminals 1-1 to 1-*n* each have a function of uniquely determining a period of time that elapses before a reboot processing of the self is performed. The period is set with a self reboot waiting timer serving as a first timer. Furthermore, the VoIP terminals 1-1 to 1-*n* each include means for communicating with another VoIP terminal which has functions of the same type or different types. The communication means has a function of exchanging a value of the self reboot waiting timer, which is held by each VoIP terminal, and setting a value of the timer for the VoIP terminal, in order to be different from those for the other VoIP terminals.

Furthermore, the VoIP terminals 1-1 to 1-*n* each have a function of waiting for a health check instruction. The function of waiting for a health check instruction is used to wait for a health check instruction issued to the own terminal from the MGC 2. A period of time for waiting for the health check instruction is set with a health check instruction waiting timer serving as a second timer.

In general, each of the VoIP terminals 1-1 to 1-*n* is diagnosed through periodic health check performed by the MGC 2. When the MGC 2 recognizes the abnormality in any of the VoIP terminals 1-1 to 1-*n*, the MGC 2 issues a reset instruction to the corresponding VoIP terminal. Upon reception of the reset instruction, the corresponding VoIP terminal performs reset processing at timing specific to the terminal to work again. The timing specific to the terminal is timing at which the value of the self reboot waiting timer of the terminal is timed out. It should be noted that the value of the self reboot waiting timer is exchanged among the VoIP terminals in advance and set to a value different for each terminal, as described above. Accordingly, in the embodiment mode of the present invention, even when abnormalities occur simultaneously in the VoIP terminals 1-1 to 1-*n*, corresponding VoIP terminals perform the registration processing with respect to the MGC 2 at different timing. Therefore, the load of the MGC 2 and the network 100 can be reduced.

When functions of each of the VoIP terminals 1-1 to 1-*n* are normal but an abnormality caused by an excessively high load of the network 100 connected to the VoIP terminals 1-1 to 1-*n* is detected, each of the VoIP terminals 1-1 to 1-*n* has a function of performing the reset processing at timing specific to the terminal to work again. The timing is set as the value of the self reboot waiting timer, which is different from those for the other terminals. Accordingly, in the embodiment mode of the present invention, the VoIP terminals 1-1 to 1-*n* perform the registration processing with respect to the MGC 2 at different timing, so the load of the MGC 2 and the network 100 can be reduced.

When functions of each of the VoIP terminals 1-1 to 1-*n* are normal but the MGC 2 detects an abnormality in the network 100, the MGC 2 issues a reset instruction simultaneously to the VoIP terminals 1-1 to 1-*n*. Alternatively, when functions of each of the VoIP terminals 1-1 to 1-*n* are normal but the MGC 2 erroneously recognizes, due to an abnormality, the VoIP terminals 1-1 to 1-*n* or the network 100 to be abnormal, the MGC 2 also issues a reset instruction simultaneously to the VoIP terminals 1-1 to 1-*n*. However, after receiving the reset instruction, each of the VoIP terminals 1-1 to 1-*n* performs the reset processing at timing specific to the terminal to work again as described above. Therefore, the VoIP terminals 1-1 to 1-*n* perform the registration processing with respect to the MGC 2 at different timing, so the load of the MGC 2 and the network 100 can be reduced in the embodiment mode of the present invention.

Since the VoIP terminals 1-1 to 1-*n* perform the registration processing with respect to the MGC 2 at different timing, it is possible to prevent the VoIP terminals 1-1 to 1-*n* from simultaneously being unable to be used.

Figure 2:
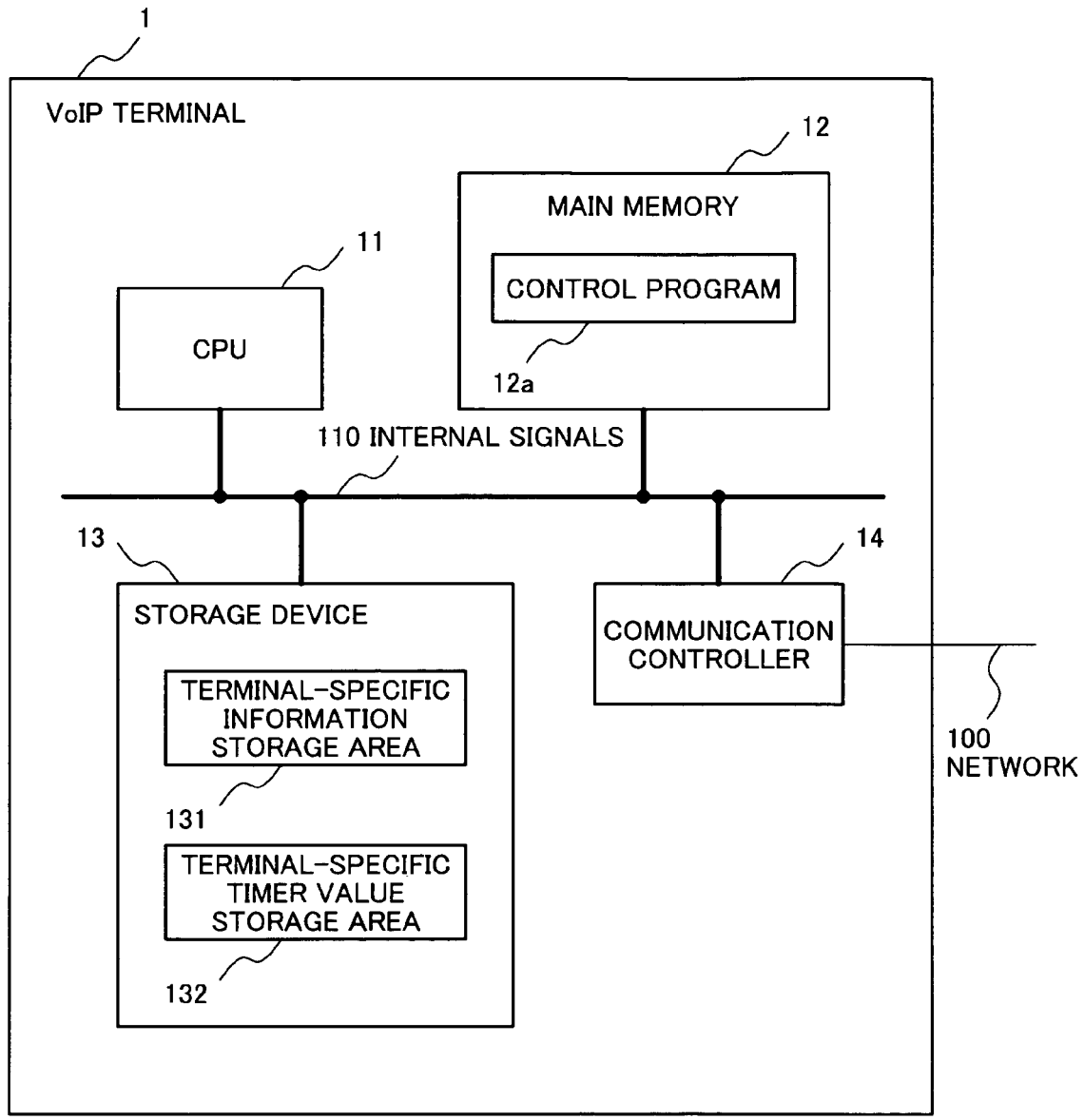
FIG. 2 is a block diagram showing a configuration of a VoIP terminal according to a first embodiment of the present invention.

Next, the embodiment mode of the present invention is described in more detail. FIG. 2 is a block diagram showing a configuration of a VoIP terminal according to a first embodiment of the present invention. It should be noted that a description is given to a VoIP terminal 1 in FIG. 2 as a representative of the VoIP terminals 1-1 to 1-*n* of FIG. 1. In FIG. 2, the VoIP terminal 1 includes a central processing unit (CPU) 11, a main memory 12, a storage device 13, and a communication controller 14. The main memory 12 stores a control program 12a executed by the CPU 11. The storage device 13 can be used as a work area when the CPU 11 executes the control program 12a. The communication controller 14 controls communication performed via the network 100.

The storage device 13 includes a terminal-specific information storage area 131 and a terminal-specific timer-value storage area 132. The terminal-specific information storage area 131 stores information specific to the VoIP terminal 1. The information specific to the VoIP terminal 1 includes a Media Access Control (MAC) address and an IP address, for example. The terminal-specific timer-value storage area 132 stores a specific variable generated through arithmetic processing with a desired function by using information specific to the VoIP terminal 1. The specific variable is the terminal-specific value of the self reboot waiting timer. Specifically, the value of the self reboot waiting timer is first calculated from the information specific to the VoIP terminal 1 stored in the terminal-specific information storage area 131, and is stored in the terminal-specific timer-value storage area 132 as a value specific to the terminal. After that, the communication controller 14 exchanges the value of the self reboot waiting timer with another VoIP terminal via the network 100. When values of the self reboot waiting timers are identical or approximate, the values of the self reboot waiting timers are calculated again. Different values of the self reboot waiting timers are set, each value being different from those for the other VoIP terminals. On the other hand, the value of the health check instruction waiting timer just needs to be stored in the terminal-specific information storage area 131 as a value specific to each terminal in consideration of the network condition.

In the VoIP terminal 1, the CPU 11, the main memory 12, the storage device 13, and the communication controller 14 are connected to each other via an internal signals 110. An IP telephony system according to the first embodiment of the present invention has the same configuration as the IP telephony system 10 shown in FIG. 1 according to the embodiment mode of the present invention. The configuration of each of the VoIP terminals 1-1 to 1-n shown in FIG. 1 is the same as that of the VoIP terminal 1 shown in FIG. 2.

Figure 3:
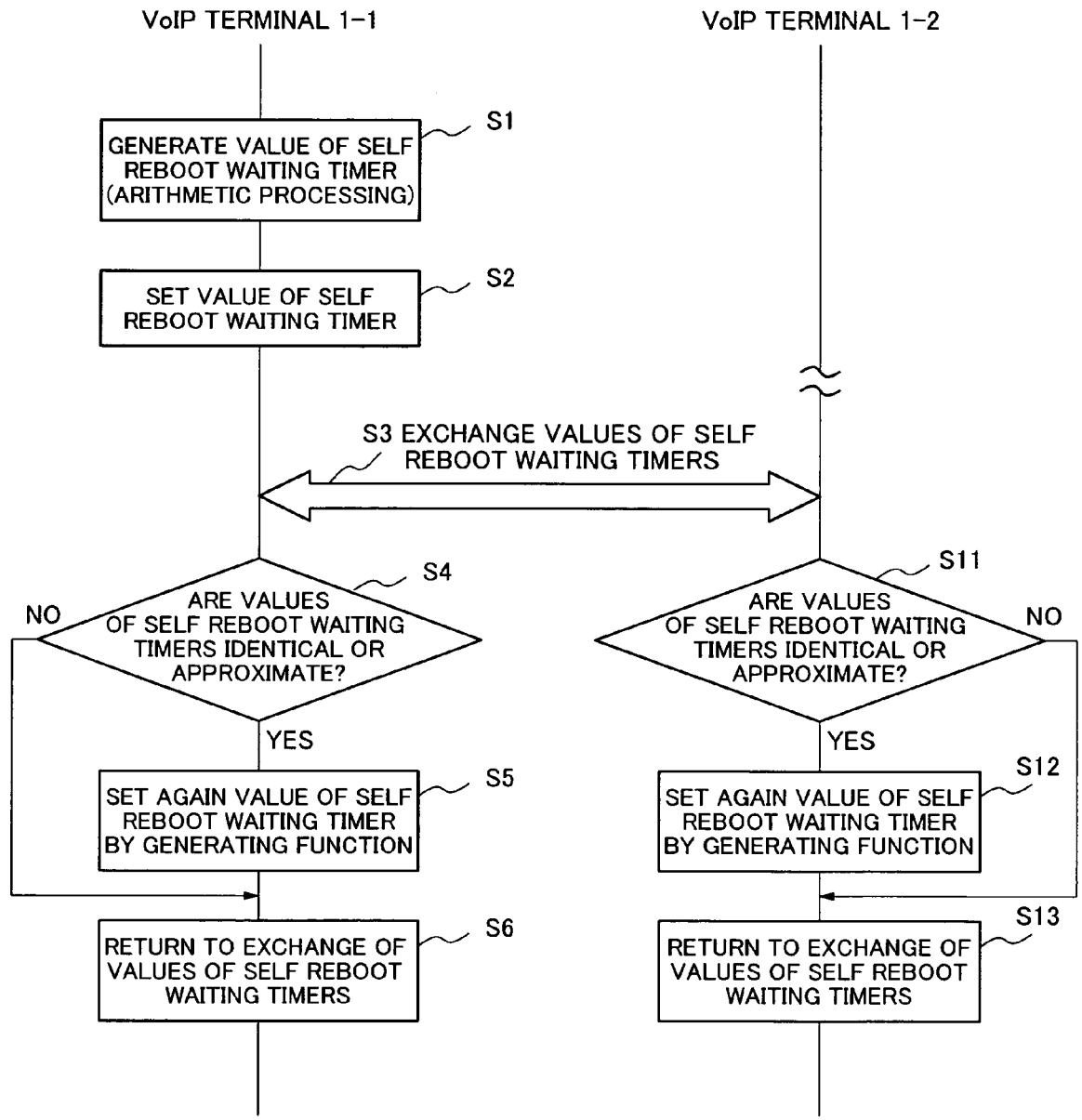
FIG. 3 is a flowchart showing an operation of exchanging a value of a self reboot waiting timer performed by the VoIP terminal according to the first embodiment of the present invention.
Figure 4:
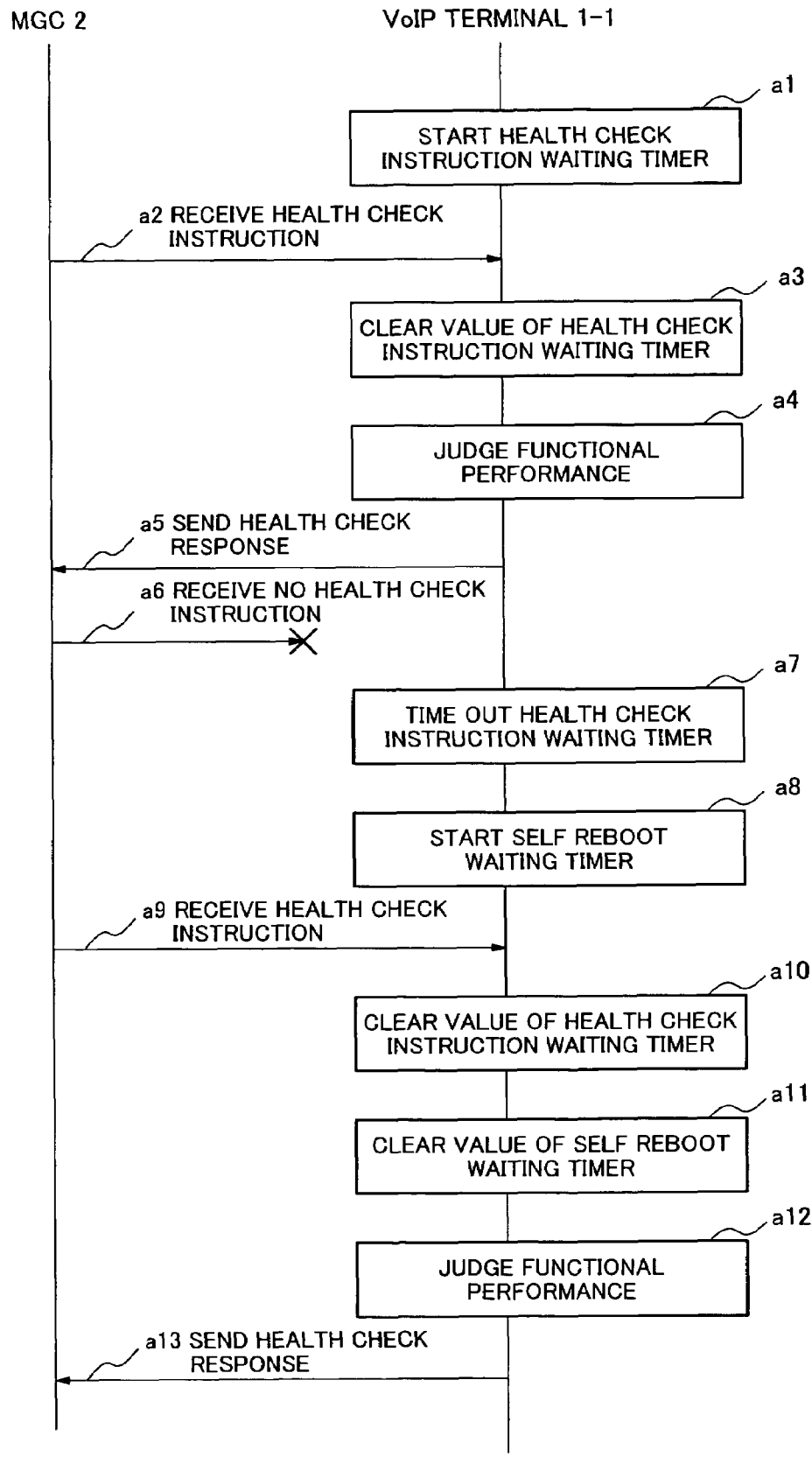
FIG. 4 is a first sequence chart showing an operation performed when an abnormality is detected in the VoIP terminal according to the first embodiment of the present invention.
Figure 5:
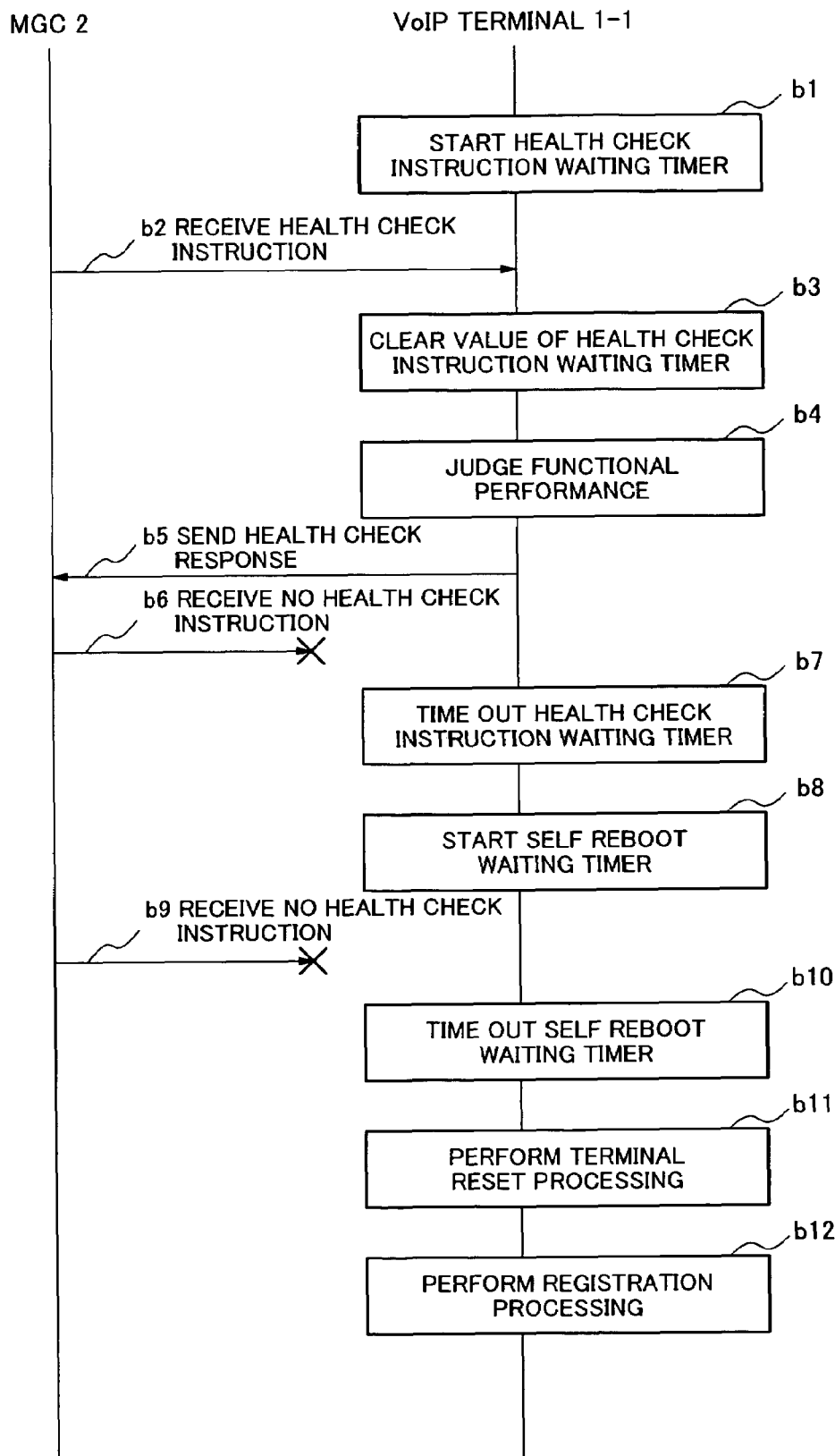
FIG. 5 is a second sequence chart showing an operation performed when an abnormality is detected in the VoIP terminal according to the first embodiment of the present invention.

Next, an operation of the IP telephony system according to the first embodiment of the present invention is described hereinafter. FIG. 3 is a flowchart showing an operation of exchanging a value of the self reboot waiting timer performed by the VoIP terminal according to the first embodiment of the present invention. FIG. 4 is a first sequence chart showing an operation performed when an abnormality is detected in the VoIP terminal according to the first embodiment of the present invention. FIG. 5 is a second sequence chart showing an operation performed when an abnormality is detected in the VoIP terminal according to the first embodiment of the present invention. Hereinafter, the operation of the IP telephony system according to the first-embodiment of the present invention is described with reference to FIGS. 1 to 5. It should be noted that processing of the VoIP terminals 1-1 and 1-2 shown in FIGS. 3 to 5 is realized when the CPU 11 executes the control program 12a stored in the main memory 12. A description is given to the VoIP terminals 1-1 and 1-2 as representatives of the VoIP terminals 1-1 to 1-n. However, identical processing is performed also in the other VoIP terminals. The VoIP terminals have functions of the same type or different types.

First, an operation of exchanging a value of the self reboot waiting timer performed by the VoIP terminals 1-1 and 1-2 of the IP telephony system 10 is described with reference to FIG. 3. Each of the VoIP terminals 1-1 and 1-2 has a function of judging the abnormality of the MGC 2 thereto or the network 100 connected thereto and performing the reboot processing of the self. More specifically, each of the VoIP terminals 1-1 and 1-2 has a function of uniquely calculating and determining a period of time that elapses before the reboot processing of the self is performed. The period of time is set in the terminal-specific timer-value storage area 132 as a value of the self reboot waiting timer, specific to the VoIP terminal. It should be noted that this function may have a mechanism in which when the VoIP terminals 1-1 and 1-2 are booted up, the MGC 2 sets the period of time for each of the VoIP terminals 1-1 and 1-2.

The VoIP terminal 1-1 performs arithmetic processing with a desired function by using a specific variable, such as a MAC address or an IP address, which is held in advance (Step S1 of FIG. 3), and generates a terminal-specific value of the self reboot waiting timer (Step S2 of FIG. 3). The value of the self reboot waiting timer is used as a waiting time to perform the reboot processing of the self. A discussion is given to a case where the multiple VoIP terminals 1-1 to 1-n perform the registration processing with respect to the MGC 2 at the same time. In this case, an excessively high load may be imposed on the MGC 2 or the network 100. To avoid this, it is necessary to generate the values of the self reboot waiting timers in consideration of the time when each of the VoIP terminals 1-1 and 1-2 performs the registration processing.

The multiple VoIP terminals 1-1 and 1-2 placed under the control of the same MGC 2 each have a function of exchanging the value of the self reboot waiting timer with each other. In other words, each of the VoIP terminals 1-1 and 1-2 has information exchanging means as means for mutually checking the calculated value of the self reboot waiting timer. The information exchanging means is realized by the CPU 11, the main memory 12, the storage device 13, and the communication controller 14 via the network 100.

The VoIP terminals 1-1 and 1-2 communicate with each other by using their information exchanging means, when booted up, at regular or irregular intervals, to exchange the calculated values of the self reboot waiting timers (Step S3 of FIG. 3). When the values of the self reboot waiting timers are identical or approximate (YES in Step S4, S11 of FIG. 3), the VoIP terminals 1-1 and 1-2 calculate again the values of the self reboot waiting timers according to a predetermined desired function and sets again the calculated values of the self reboot waiting timers, respectively (Step S5, S12 of FIG. 3). Each of the VoIP terminals 1-1 and 1-2 exchanges the value of the self reboot waiting timer with another VoIP terminal (not shown) (Step S6, S13 of FIG. 3). On the other hand, when the values of the self reboot waiting timers are not identical or approximate (NO in Step S4, S11 of FIG. 3), each of the VoIP terminals 1-1 and 1-2 exchanges the value of the self reboot waiting timer with another VoIP terminal (Step S6, S13 of FIG. 3) without setting again the value of the self reboot waiting timer.

Next, an abnormality detecting method for the MGC 2 and the VoIP terminal 1-1 of the IP telephony system according to the first embodiment of the present invention is described with reference to FIG. 4.

The VoIP terminal 1-1 starts the health check instruction waiting timer which is set to a predetermined value in advance (a1 of FIG. 4), and moves to a state of waiting for a health check instruction issued from the MGC 2. When the VoIP terminal 1-1 receives a health check instruction from the MGC 2 that controls the terminal within the time of the health check instruction waiting timer (a2 of FIG. 4), the VoIP terminal 1-1 clears the value of the health check instruction waiting timer (a3 of FIG. 4) and immediately judges functional performance (a4 of FIG. 4). The VoIP terminal 1-1 returns a health check response together with information indicating the functional performance (a5 of FIG. 4).

On the other hand, when the VoIP terminal 1-1 does not receive a health check instruction from the MGC 2 that controls the terminal within the time of the health check instruction waiting timer which is set to a predetermined value in advance (a6, a7 of FIG. 4), the VoIP terminal 1-1 starts the self reboot waiting timer (a8 of FIG. 4). With this operation, the VoIP terminal 1-1 moves to a state of waiting for a health check instruction issued from the MGC 2. After that, when the VoIP terminal 1-1 receives a health check instruction within the time of the self reboot waiting timer (a9 of FIG. 4), the VoIP terminal 1-1 clears the value of the health check instruction waiting timer and the self reboot waiting timer (a10, all of FIG. 4). Then, as described above, the VoIP terminal 1-1 immediately judges the functional performance (a12 of FIG. 4) and returns a health check response together with information indicating the functional performance (a13 of FIG. 4).

Furthermore, the abnormality detecting method for the MGC 2 and the VoIP terminal 1-1 of the IP telephony system according to the first embodiment of the present invention is described with reference to FIG. 5.

The VoIP terminal 1-1 starts the health check instruction waiting timer which is set to a predetermined value in advance (b1 of FIG. 5), and moves to a state of waiting for a health check instruction issued from the MGC 2. When the VoIP terminal 1-1 receives a health check instruction from the MGC 2 that controls the terminal within the time of the health check instruction waiting timer (b2 of FIG. 5), the VoIP terminal 1-1 clears the value of the health check instruction waiting timer (b3 of FIG. 5) and immediately judges functional performance (b4 of FIG. 5). The VoIP terminal 1-1 returns a health check response together with information indicating the functional performance (b5 of FIG. 5).

On the other hand, when the VoIP terminal 1-1 does not receive a health check instruction from the MGC 2 that controls the terminal within the time of the health check instruction waiting timer which is set to a predetermined value in advance (b6, b7 of FIG. 5), the VoIP terminal 1-1 starts the self reboot waiting timer (b8 of FIG. 5). With this operation, the VoIP terminal 1-1 moves to a state of waiting for a health check instruction issued from the MGC 2. When the VoIP terminal 1-1 does not receive a health check instruction from the MGC 2 that controls the terminal within the time of the self reboot waiting timer (b9, b10 of FIG. 5), the VoIP terminal 1-1 judges that the MGC 2 is abnormal or the connected network 100 is abnormal. Then, the VoIP terminal 1-1 immediately performs the reboot processing of the self (b11 of FIG. 5) and performs the registration processing with respect to the corresponding MGC 2 (b12 of FIG. 5). Accordingly, the VoIP terminal 1-1 works again.

As described above, in the first embodiment, when the MGC or the network is abnormal and the VoIP terminals recognize the abnormality of the MGC or the network, the VoIP terminals perform the reset processing at different terminal-specific timing to reboot themselves. Accordingly, the respective VoIP terminals perform the registration processing with respect to the MGC at different timing. Therefore, in the first embodiment, the load of the MGC and the network, which is caused by the registration processing of the VoIP terminals can be reduced.

Furthermore, in the first embodiment, since the VoIP terminals perform the reset processing at different terminal specific timing, the timing at which each of the VoIP terminals is unable to be used is different. Therefore, the first embodiment also has an effect in which all lines are prevented from being unable to be used.

Figure 6:
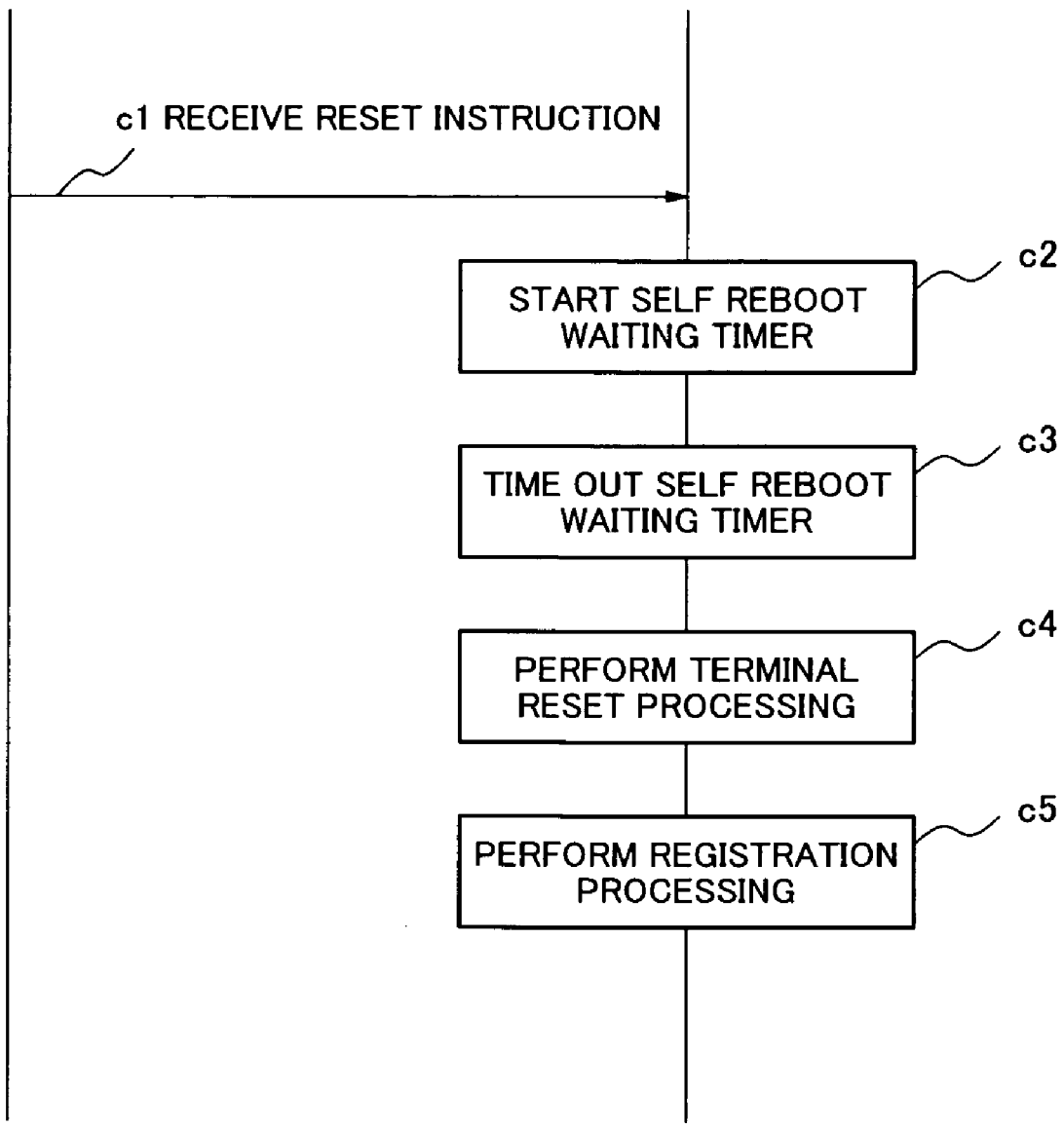
FIG. 6 is a sequence chart showing an operation performed by a VoIP terminal when an abnormality is detected in an MGC, according to a second embodiment of the present invention.

FIG. 6 is a sequence chart showing an operation performed by the VoIP terminal when an abnormality is detected in the MGC, according to a second embodiment of the present invention. An abnormality detecting method for the MGC 2 and the VoIP terminal 1-1 of the IP telephony system according to the second embodiment of the present invention is described with reference to FIG. 6. It should be noted that the IP telephony system according to the second embodiment of the present invention has a configuration similar to the IP telephony system 10 shown in FIG. 1 according to the embodiment mode of the present invention. The VoIP terminals 1-1 to 1-n of the IP telephony system 10 each have the a configuration similar to the VoIP terminal 1 shown in FIG. 2 according to the first embodiment of the present invention. Processing of the VoIP terminal 1-1 of FIG. 6 is realized when the CPU 11 shown in FIG. 2 executes the control program 12a stored in the main memory 12.

Next, an operation of the IP telephony system according to the second embodiment of the present invention is described hereinafter. When the MGC 2 judges that the VoIP terminal 1-1 or the connected network 100 is abnormal, the MGC 2 issues a reset instruction as a remedy to the VoIP terminal 1-1 (c1 of FIG. 6). Upon reception of the reset instruction, the VoIP terminal 1-1 starts the self reboot waiting timer which is set to a predetermined value in advance (c2 of FIG. 6). After waiting for the time to pass, which is set with the self reboot waiting timer (c3 of FIG. 6), the VoIP terminal 1-1 immediately performs a reset processing (c4 of FIG. 6). After that, the VoIP terminal 1-1 performs the registration processing with respect to the corresponding MGC 2 (c5 of FIG. 6). Accordingly, the VoIP terminal 1-1 works again.

As described above, in the second embodiment, when the MGC judges that the VoIP terminal or the network is abnormal, the MGC issues a reset instruction simultaneously to the multiple VoIP terminals. However, the respective VoIP terminals, to which the reset instruction are issued, perform the reset processing at different terminal-specific timing to reboot themselves. Accordingly, the VoIP terminals perform the registration processing with respect to the MGC at different timing. Therefore, in the second embodiment, the load of the MGC and the network, which is caused by the registration processing of the VoIP terminals can be reduced.

Furthermore, in the second embodiment, since the VoIP terminals perform the reset processing at different terminal specific timing, the timing at which each of the VoIP terminals is unable to be used is different. Therefore, the second embodiment also has an effect in which all lines are prevented from being unable to be used.

It should be noted that the above embodiments are preferred embodiments to implement the present invention and various changes may be made without departing from the scope of the present invention. For example, the above embodiments may be used in combination.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

Further, the inventor's intent is to retain all equivalents of the claimed invention even if the claims are amended later during prosecution.

What is claimed is:

1. A management system for managing communication in a network, comprising:
   a plurality of communication apparatuses in connection with the network for performing communication; and
   a management apparatus configured to register the communication apparatuses, and to transmit a reset instruction, upon detection of an abnormality, that causes each of the communication apparatuses to perform reset processing,
   wherein each of the communication apparatuses comprises
      a self reboot waiting timer configured to wait for a time period based on a first terminal-specific value and then to initiate the reset processing responsive to the reset instruction transmitted by the management apparatus, the reset processing to be followed by registration processing to register with the management apparatus,
      an arithmetic processor configured to generate the first terminal-specific value by performing an arithmetic processing with a predetermined function upon a specific variable that is unique to each one of the communication apparatuses in the network, and
      a communication controller configured to communicate with other ones of the communication apparatuses that are managed by the management apparatus on the network in order to mutually exchange the first terminal-specific value with terminal-specific values of the other ones of the communication apparatuses and to confirm whether the first terminal-specific value is unique with respect to the terminal-specific values of the other ones of the communication apparatuses, and upon detection that the first terminal-specific value is not unique, to instruct the arithmetic processor to generate a second terminal-specific value that is different from the first terminal-specific value.

2. The management system according to claim 1,
   wherein the management apparatus is further configured to transmit a periodic health check instruction configured to cause each of the communication apparatuses to perform a self-check of functional performance,
   wherein each of the communication apparatuses further comprises a health check instruction waiting timer configured to wait, for a predetermined time period, for the periodic health check instruction to be received from the management apparatus, and
   wherein, upon detection that the health check instruction is not received from the management apparatus within the predetermined time period of the health check instruction waiting timer, the self reboot waiting timer is started for counting down the time period of the self reboot waiting timer and reset processing is initiated upon expiration of the time period of the self reboot waiting timer unless the health check instruction is received from the management apparatus within the time period of the self reboot waiting timer.

3. The management system according to claim 1, wherein the management apparatus comprises a multimedia gateway controller, and the communication apparatuses comprise Voice over Internet Protocol terminals connected via an Internet Protocol network.

4. A communication apparatus connected in a network for performing communication in a system managed by a management apparatus configured to managing a plurality of communication apparatuses, the communication apparatus comprising:
   a self reboot waiting timer configured to, upon receiving a reset instruction from the management apparatus, wait for a time period based on a first terminal-specific value and then to initiate a reset processing and subsequent registration processing with the management apparatus, the management apparatus transmitting the reset instruction upon detection of an abnormality;
   an arithmetic processor configured to perform arithmetic processing with a predetermined function and a terminal-specific variable that is unique to the communication apparatus, thereby to generate the first terminal-specific value; and
   a communication controller configured to communicate with other communication apparatuses managed by the management apparatus in order to mutually exchange the first terminal-specific value with terminal-specific values of the other communication apparatuses and to confirm whether the first terminal-specific value is unique with respect to the terminal-specific values of the other communication apparatuses, and upon detection that the first terminal-specific value is not unique, to instruct the arithmetic processor to generate a second terminal-specific value that is different from the first terminal-specific value.

5. The communication apparatus according to claim 4, further comprising:
   a health check instruction waiting timer configured to wait, for a predetermined time period, for a periodic health check instruction to be received from the management apparatus,
   wherein the health check instruction waiting timer is configured to, upon receipt of the health check instruction from the management apparatus within the predetermined time period of the health check instruction waiting timer, cause the communication apparatus to perform a self-check of functional performance, and
   wherein, upon detection that the health check instruction is not received from the management apparatus within the predetermined time period of the health check instruction waiting timer, the self reboot waiting timer is started for counting down the time period of the self reboot waiting timer and reset processing is initiated upon expiration of the time period of the self reboot waiting timer unless the health check instruction is received from the management apparatus within the time period of the self reboot waiting timer.

6. The communication apparatus according to claim 4,
   wherein the communication apparatuses comprises a Voice over Internet Protocol terminal configured for connection to an Internet Protocol network.

7. A management method for managing communication of a plurality of communication apparatuses connected in a network with a management apparatus for registering and managing the communication apparatuses, the method comprising:
   performing, at each of the communication apparatuses, arithmetic processing with a predetermined function upon a specific variable that is unique to each one of the communication apparatuses, thereby to generate at each one of the communication apparatuses a first terminal-specific value for use at each of the communication apparatuses as a timer value for a self reboot waiting timer configured to start reset processing and subsequent registration processing with the management apparatus in the event that a reset instruction from the management apparatus is received, the management apparatus transmitting the reset instruction upon detection of an abnormality;

communicating, between the communication apparatuses, the first terminal-specific values generated by the communication apparatuses and testing whether the first terminal-specific value of any one communication apparatus is unique with respect to the first terminal-specific values of every other communication apparatus; and upon detection that a first terminal-specific value of one communication apparatus is identical to a first terminal-specific value of another communication apparatus, causing said one communication apparatus to generate a second terminal-specific value that is different from the first terminal-specific value of said one communication apparatus.

8. The management method according to claim 7, further comprising:

counting, at each of the communication apparatuses, in accordance with a predetermined time period via a health check instruction waiting timer for waiting to receive a periodic health check instruction from the management apparatus for causing the communication apparatuses to perform a self-check of functional performance;

upon detection at any of the communication apparatuses that the health check instruction is not received from the management apparatus within the predetermined time period of the health check instruction waiting timer, starting the self reboot waiting timer to count down the time period of the self reboot waiting timer; and upon detection at any of the communication apparatuses that the health check instruction is not received from the management apparatus within the time period of the self reboot waiting timer, initiating reset processing.

* * * * *